(12) United States Patent
Correns et al.

(10) Patent No.: US 9,625,317 B2
(45) Date of Patent: Apr. 18, 2017

(54) MONOLITHIC SPECTROMETER ARRANGEMENT

(71) Applicant: Nico Correns, Weimar (DE)

(72) Inventors: Nico Correns, Weimar (DE); Hans-Juergen Dobschal, Kleinromstedt (DE)

(73) Assignee: Nico Correns, Weimar (DE)

( * ) Notice: Subject to any disclaimer, the term of this patent is extended or adjusted under 35 U.S.C. 154(b) by 148 days.

(21) Appl. No.: 14/415,357

(22) PCT Filed: Jun. 11, 2013

(86) PCT No.: PCT/EP2013/061958
§ 371 (c)(1),
(2) Date: May 11, 2015

(87) PCT Pub. No.: WO2014/001074
PCT Pub. Date: Jan. 3, 2014

(65) Prior Publication Data
US 2015/0241277 A1   Aug. 27, 2015

(30) Foreign Application Priority Data
Jun. 27, 2012   (DE) .................. 10 2012 210 954

(51) Int. Cl.
*G01J 3/02*   (2006.01)
*G01J 3/18*   (2006.01)
*G01J 3/28*   (2006.01)

(52) U.S. Cl.
CPC .............. *G01J 3/18* (2013.01); *G01J 3/0259* (2013.01); *G01J 3/2823* (2013.01)

(58) Field of Classification Search
CPC ............................. G01J 3/0259; G01J 3/0256
See application file for complete search history.

(56) References Cited

U.S. PATENT DOCUMENTS 4,744,618 A * 5/1988 Mahlein ................ G01J 3/0259
385/33
5,026,160 A * 6/1991 Dorain .................... G01J 3/02
356/328

(Continued)

FOREIGN PATENT DOCUMENTS

DE           4340107 A1    7/1995
DE         10127340 A1    6/2003

(Continued)

OTHER PUBLICATIONS

Langenscheitd Foreign Language Dictionary; Duden online, 1 page.
International Search Report and Written Opinion of corresponding PCT application PCT/EP2013/061958, 18 pages.

*Primary Examiner* — Kara E Geisel
*Assistant Examiner* — Shawn DeCenzo
(74) *Attorney, Agent, or Firm* — Fitch, Even, Tabin & Flannery LLP

(57) ABSTRACT

The invention relates to a spectrometer arrangement comprising successively in the light propagation direction: —a converging optical unit (3), designed for focusing and orienting the incident light onto an entrance slit (4), and —an imaging system disposed downstream of the entrance slit (4) and having at least one dispersive element, designed for imaging a dispersion spectrum of the incident light beam (2) onto a spatially resolving detection device. According to the invention, in a spectrometer arrangement of this type —the entrance slit (4) is embodied in a reflective fashion, and —at least the converging optical unit (3), the entrance slit (4) and an imaging grating (5, 13) are combined in a module (1), wherein they are integrated as components in a monolithic main body (6), or are embodied as optically active forms or structures on a monolithic main body (6).

12 Claims, 3 Drawing Sheets

(56) References Cited

U.S. PATENT DOCUMENTS

| | | | | |
|---|---|---|---|---|
| 5,812,262 | A * | 9/1998 | Ridyard | G01J 1/429 250/372 |
| 6,657,723 | B2 * | 12/2003 | Cohen | G02B 6/12007 356/328 |
| 8,045,159 | B2 | 10/2011 | Egloff et al. | |
| 8,345,226 | B2 * | 1/2013 | Zhang | G01J 3/02 356/39 |
| 8,861,060 | B2 | 10/2014 | Puegner et al. | |
| 2006/0268269 | A1 * | 11/2006 | Warren | G01J 3/02 356/328 |
| 2007/0160325 | A1 * | 7/2007 | Son | G01J 3/02 385/37 |
| 2008/0030728 | A1 * | 2/2008 | Nguyen | G01J 3/02 356/328 |
| 2009/0091754 | A1 | 4/2009 | Zhang | |
| 2009/0262346 | A1 * | 10/2009 | Egloff | G01J 3/02 356/326 |
| 2012/0086946 | A1 * | 4/2012 | Szarmes | G01J 3/1804 356/451 |
| 2012/0307081 | A1 * | 12/2012 | Dewald | G01J 3/10 348/207.11 |
| 2013/0201475 | A1 * | 8/2013 | Yamazaki | G01J 3/0208 356/302 |
| 2014/0118738 | A1 * | 5/2014 | Comstock, II | G01J 3/2823 356/328 |
| 2015/0022811 | A1 * | 1/2015 | Cornell | G02B 17/0636 356/326 |

FOREIGN PATENT DOCUMENTS

| | | |
|---|---|---|
| DE | 10200809600 A1 | 10/2009 |
| DE | 102010040768 A1 | 3/2012 |
| EP | 0093396 A2 | 11/1986 |
| GB | 2217870 A | 11/1989 |
| WO | 01/86848 A1 | 11/2001 |
| WO | 2006/010367 A2 | 2/2006 |

* cited by examiner

MONOLITHIC SPECTROMETER ARRANGEMENT

CROSS REFERENCE TO RELATED APPLICATIONS

This patent application is the national phase of PCT/EP2013/061958 filed Jun. 11, 2013, which claims the benefit of German Patent Application No. DE 102012210954.4 filed Jun. 27, 2012.

FIELD OF THE INVENTION

The invention relates to a spectrometer arrangement comprising successively in light propagation direction:
a converging optical unit designed for focusing and orienting the incident light onto an entrance slit, and
an imaging system downstream of the entrance slit and having at least one dispersive element, designed for imaging a dispersion spectrum of the incident light beam onto a spatially resolving detection device.

STATE OF THE ART

Spectrometer arrangements per se have been known in the most diverse embodiments. However, the achieved state of development has, at present, not satisfied all of the technical requirements as of yet, i.e., despite great costs expended internationally for the continued development.

One of the most important objectives in the development of new spectrometers, next to achieving the demanded optical parameters, is the reduction of manufacturing costs and the design space with a concurrent increase of robustness in view of mechanical and thermal influences. The smaller, i.e., the more compact, the design, and the smaller the number of individual components, the better the ratio of manufacturing costs relative to the benefit to the customer.

A few known embodiments of spectrometers comprising converging optical units are already designed so as to be adjustment-free; however, they consist of a plurality of function-defining individual components, as a result of which the costs for assembly and manufacturing are still rather high. The non-adjustment features achieved so far result in the restriction of system parameters, despite the complex design and the related disadvantageous linking of the tolerances of the individual components. For example, the total actually available receiving area of the detection device cannot be used, or the spectral resolution is decreased. Furthermore, the optical boundary surfaces existing in the optical path contribute to a reduction of the effectiveness of the optical parameters of the system. Also, the design volume is still relatively large and the robustness is inadequate—in particular in view of temperature influences. This also applies to the subject matter of grating spectrometers to which the invention described hereinafter is to be assigned.

DESCRIPTION OF THE INVENTION

Considering this, the object of the invention is to eliminate the shortcomings of prior art to the greatest possible extent.

In an inventive spectrometer arrangement of the previously described type
the entrance slit is configured so as to be reflective, and
at least the converging optical unit, the entrance slit and the dispersive element are combined in a module, wherein
they are integrated as components in a monolithic main body, or
configured as optically active forms or structures on a modular monolithic main body.

Optically active forms are to be understood, for example, as surface curvatures; optically active structures are profiles, for example grid profiles, on the surface, or refractive number gradients inside of the main body material. Within the context of this invention, monolithic is understood to mean consisting of one piece, cohesive and without joints, or composed of very small, inseparably assembled structural components (see: Langenscheidt Foreign Language Dictionary; Duden online, on 14 Apr. 2012).

Preferably, the converging optical unit is transmissive and formed as a curved area adjoining the surface of the modular main body. This surface region thus corresponds, at the same time, to a boundary surface where the light impinges from the exterior medium, e.g., air or the free atmosphere, into the main material.

The entrance slit that is configured so as to be reflective in accordance with the invention is preferably a rectangularly formed mirrored area on the surface of the main body material, said region being dimensioned and oriented relative to the converging optical unit in such a manner that the incident light beam—or at least a portion thereof sufficient for a spectral measurement—coming from the converging optical unit is reflected toward the dispersive element. The dimension of this mirrored area in dispersion direction is, for example, at most 0.5 mm, and at most 10 mm orthogonally to the direction of dispersion. The mirrored area is surrounded by non-reflective or at least minimally reflective surface areas of the main body material or by surface areas whose normal deviates from the normal of the mirrored surface, so that the directions of reflection are different and, with respect thereto, the influence of the result of the spectral measurement by false light and scattered light is avoided or at least kept to a minimum.

The dispersive element that is provided is preferably a surface region of the main body material structured as an imaging grid and designed in various embodiments so as to be transmissive or reflective.

In the first-mentioned case, i.e., the transmissive embodiment, the measuring light that has been refracted by the grating exits as the measuring light directly from the module and is subsequently,
in a first embodiment, imaged directly on the spatially resolving detection device, or
in a second embodiment, first directed through the optical assemblies to affect or shape the imaging optical path that is directed onto the spatially resolving detection device.

Referring to the first embodiment, there is provided between the module and the detection device, either a free beam guide or a beam guide by means of optical fibers, in which case the measuring light preferably is shaped to form a parallel—or at least approximately parallel—optical path. The cross-section of the optical path is adapted to the sensor array of the concretely embodied spatially resolving detection device. Optionally, the detection device comprises a micro-lens array that bundles the measuring light, focusing it onto the photosensitive regions of the sensor elements and, in doing so, using it efficiently for measuring, whereby, at the same time, the tolerance requirements of the detection device to be used are not as strict as with a less efficient utilization of light.

Referring to the second embodiment, the optical path exiting the module is adapted to the input parameters of the downstream optical assemblies, for example, to the entrance back focal distance of a downstream imaging system; preferably, the optical path of the measuring light between the module and the downstream optical assembly is parallel or almost parallel. Therefore, it is within the scope of the invention to couple the measuring light exiting from the module into the lens system of a downstream multimedia hand-held device, for example in the form of a commercially available smartphone. In doing so, the module and the hand-held device are mechanically connected to each other by means of a holder, in which case the holder defines—at the same time—the functionally appropriate position and orientation of the module and the hand-held device relative to each other.

In the case of an imaging grating that is configured so as to be reflective, the light is reflected inside the modular main body by the grating to a separate mirrored area of the main body material and only exits through said body from the module. Also in this case, the exiting light is imaged either directly or via separate optical assemblies for further forming an imaging optical path on the spatially resolving detection device. Also in this case a provision may be made of arranging the detection device at a prespecified distance from the modular main body. However, it is also within the scope of the invention to provide the detection device, e.g., configured as a sensor array, in a space-saving manner directly on the surface area of the main body where the light exits.

Referring to the last-mentioned embodiment, i.e., the one with the integrated detection device, the module corresponds to a compact spectrometer arrangement. In contrast, in the embodiment without the detection device, the module should be understood to be a compact optical assembly that is suitable for the representation of light broken down by wavelengths and frequencies, respectively, among other things, also including a spectrometer attachment.

In order to avoid any corruption of measured values due to false or scattered light, the light entrance area of the converging optical unit can be provided and/or nano-structured with an anti-reflection coating, the entrance slit can be arranged so as to be totally reflective, and/or its mirrored surface may also be nano-structured. The light exit area on the modular main body should also be provided with an anti-reflection coating, so that the entry of undesirable radiation opposite the light exit direction into the interior of the modular main body is prevented to the greatest possible extent.

As an alternative to the anti-reflection coatings or also in addition thereto, color filters or partial order sorting filters for filtering out interfering light, means for the absorption of false light energy or also means for conducting false light and scattered light out of the module may be provided, in particular in view of the light transmitted or reflected without being diffracted by the grating, i.e., also light referred to as zero diffraction order light.

In order prevent light from passing exclusively through the converging optical unit, however not also through the remaining surface of the modular main body into the module, the surface—outside the area of the converging optical unit and the area of the grating or the light exit area—can be provided with an intransparent coating that absorbs light energy. The light exit area is anti-reflection coated, so that—also here—the incidence of light opposite the light exit direction is prevented to the greatest possible extent.

Instead of such an intransparent, light energy absorbing exterior coating, or also in addition thereto, it is possible, considering the embodiment already described hereinabove, said embodiment providing a mechanical connection of the module with a multi-media hand-held unit by means of a holder, to design the holder not only for positioning and orienting the hand-held unit relative to the module but in order to provide a light screen enclosing the module at the same time, in which case only the light entrance area and the light exit area are excluded from this screen.

The converging optical unit is preferably designed so as to be aspherically curved. The modular main body—in special embodiments—may also comprise hollow spaces or recesses filled with air or gas, these passing the optical paths extending from the converging optical unit to the light exit area.

Optionally, the converging optical unit may be connected to means for homogenizing the intensity of the light, for example to an optical component that is integrated in the converging optical unit on the lens side and that homogenizes the light entering into the module.

Preferably, the monolithic main body—including the incorporated optically active structures in the form of the converging optical unit, the entrance slit and the imaging grating, are made of glass or of a polymer, preferably by injection molding. In doing so, the refractive index of the material used for the main body material is greater than the refractive index of the environment, and the preferred material used for the base body is glass or polymer material exhibiting the lowest possible heat expansion coefficient.

The spectrometer arrangement according to the invention may comprise one or more channels. A multi-channel arrangement requires a two-dimensional, spatially resolving detection device, wherein several spectra of different measured locations are imaged simultaneously next to each other in the second detector dimension (transversely to dispersion direction). Each detector row then represents one measuring channel. In an embodiment with multiple channels either each measuring channel is assigned one separate reflective entrance slit, or each measuring channel is allocated a separate region of one and the same reflective entrance slit. In doing so, the individual entrance slit regions are reserved for adjoining detection areas located on a two-dimensional sensor array of the detection device vertically with respect to the dispersion direction.

The scope of the invention also expressly covers embodiments wherein, in addition to one imaging grating, there is provided at least one second dispersive element that, compared with the first element, exhibits the same or orthogonal dispersion direction. With the same dispersion direction, the spectrum is advantageously further spread, thus resulting in an increased resolution. With the crossed dispersion direction—comparable to an Echelle spectrometer—the sensor array of a detection device is optimally utilized and a clearly increased resolution with the same design size and manufacturing costs is achieved.

The advantages of the invention are, above all—compared with prior art—a minimization of the manufacturing costs, a further reduction of the design space with the simultaneous improvement of the optical, mechanical and thermal parameters and the measuring accuracy, as well as the modular design.

BRIEF DESCRIPTION OF THE DRAWINGS

Hereinafter, the invention will be described in greater detail with reference to a few exemplary embodiments and associate drawings. They show in FIG. 1 an example of an inventive spectrometer arrangement comprising a module with a converging optical unit, an entrance slit and an imaging transmission grating, as well as a smartphone downstream of the module in light propagating direction.

DETAILED DESCRIPTION OF THE DRAWINGS

Figure 1:
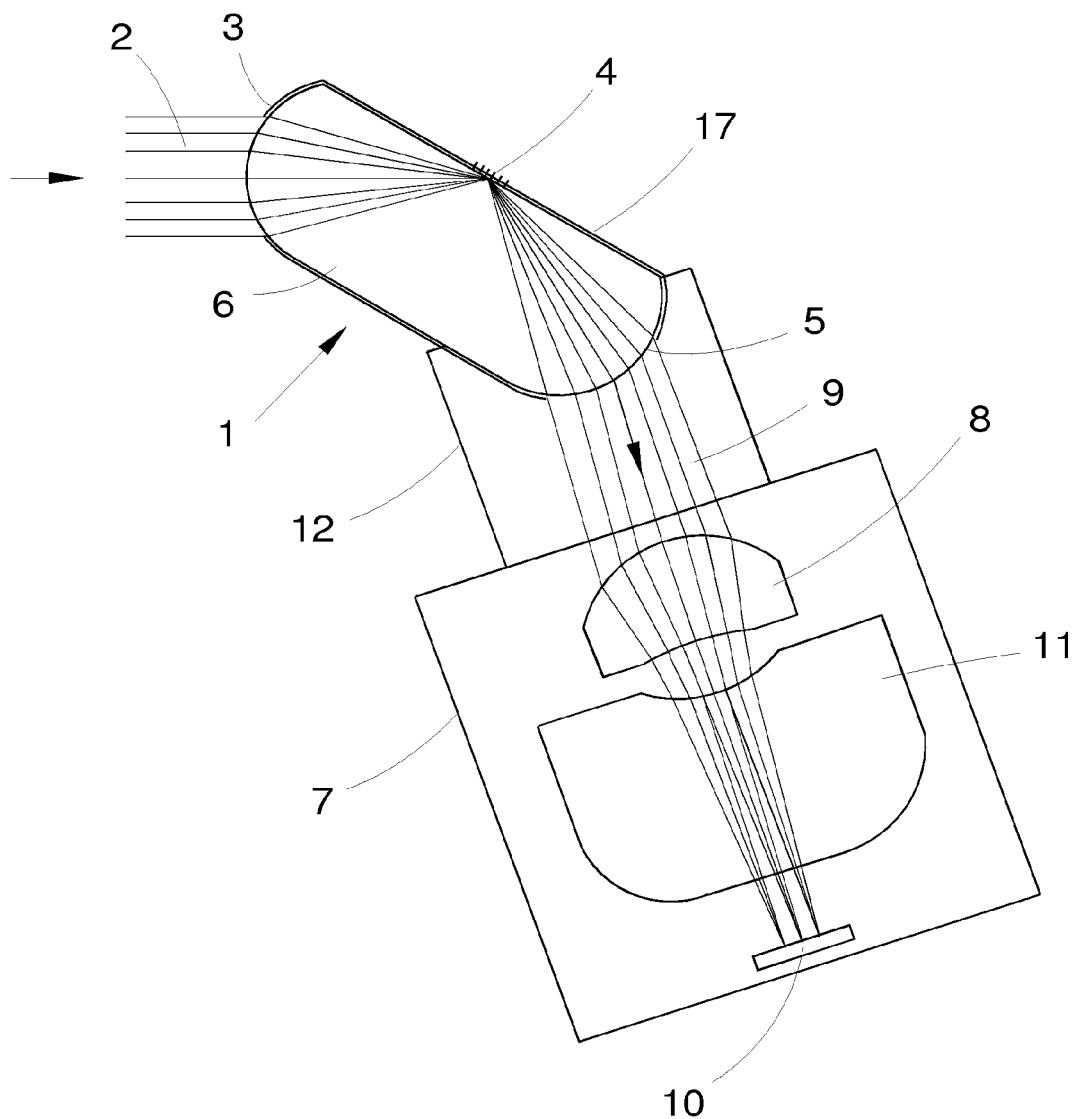

As shown by FIG. 1 using the principle of a first embodiment, a module 1 comprises—in the direction of an incident light beam 2 whose spectrum is to be measured—a transmissive converging optical unit 3, a mirrored surface area as the reflective entrance slit 4, and a transmissive imaging grating 5. The converging optical unit 3, the entrance slit 4 and the imaging grating 5 are integrated in a main body 6 that can be produced by pressure die casting or by injection molding in a technologically inexpensive manner.

The converging optical unit 3 and the imaging grating 5, for example, are embodied as free-form aspheres. Methods for the production of curved, including aspherically curved, surfaces on pressure die cast or injection molded plastic bodies have been sufficiently known from prior art and, therefore, do not require further explanation. A method for the production of finely structured curved body surfaces by pressure die casting or injection molding, in particular for the molded addition of concave and convex diffraction gratings, has been described explicitly in publication DE 4340107 A1. It also provides an explanation for the production of gratings with advantageous reflection properties and scattering properties, as well as anti-reflection coatings.

A smartphone 7 that is arranged downstream of the module 1 in light propagation direction comprises optical components and optical paths for imaging a light beam 9 incident in its lens 8 onto a two-dimensionally spatially resolving detection device 10. For the sake of clarity, only the lens 8 and, symbolically, a lens assembly 11 of said optical components are shown. The module 1 and the smartphone 7 are mechanically connected to each other by means of a holder 12, in which case the holder 12, at the same time, defines the position and orientation of the module 1 and the smartphone 7 relative to each other. The holder 12 is preferably designed in such a manner that the connection between the module 1 and the smartphone 7 can be manually easily established and severed without additional aids, so that the module 1, as well as the smartphone 7, can be used separately in an autonomous manner. For example, the module 1 can be used, without opto-electronic evaluation, simply for the representation of incident light that has been broken down by wavelengths or frequencies, and the smartphone can be used consistent with its originally defined purpose.

In principle, also optical systems or devices suitable for imaging and measuring the dispersion spectrum other than the smartphone 7 can be used. However, smartphones advantageously comprise functions and functional assemblies of a mobile telephone and are thus equipped with an internal energy supply source, and comprise data storages and allow the transmission of resultant data to external storages and data processing units.

An intransparent, light energy absorbing coating 17 on the surface of the main body 6 ensures that no undesirable light reaches the interior of the module through the main body surface. The coating 17 leaves out only the area of the converging optical unit 3 and the area of the grating 5.

Figure 2:
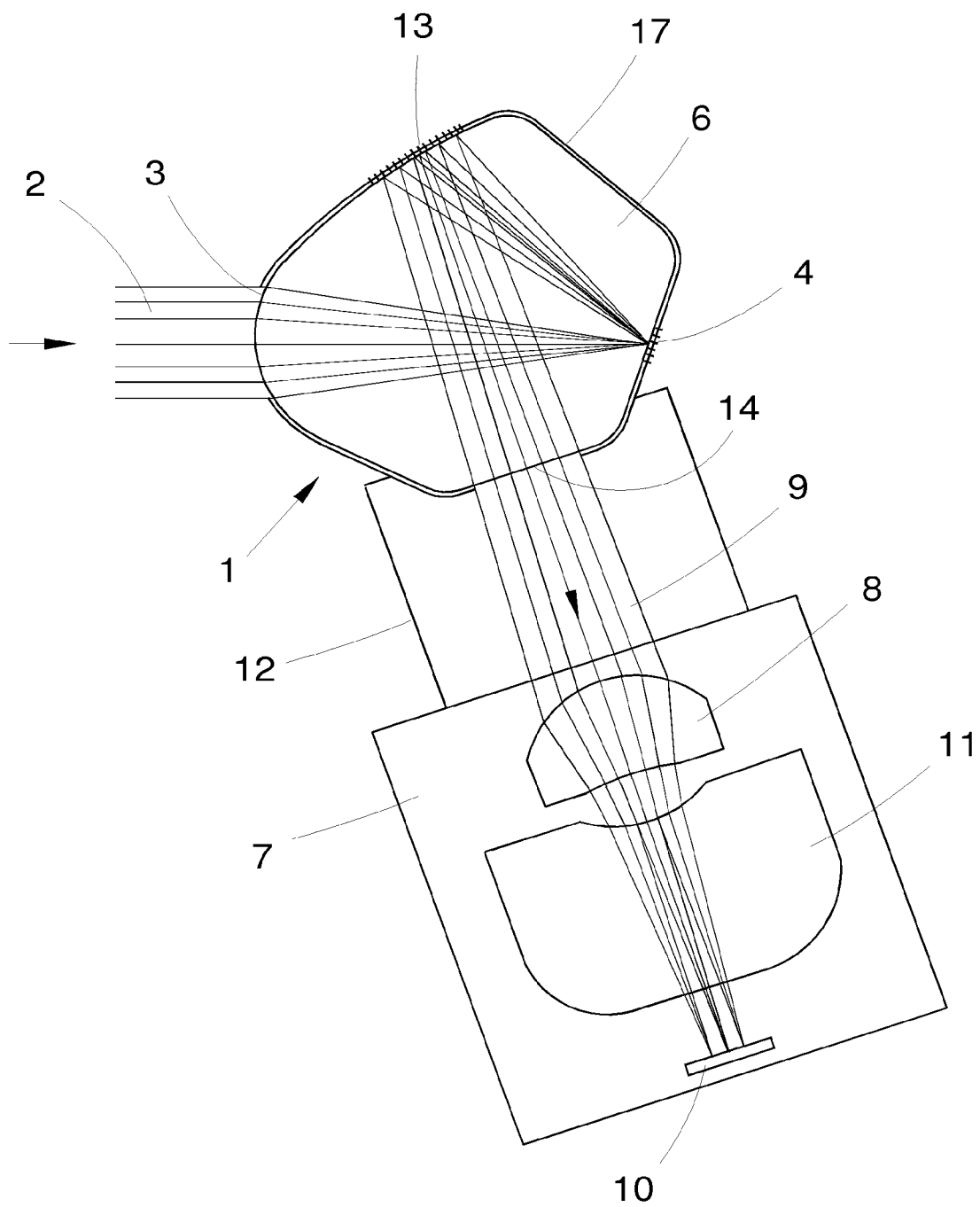
FIG. 2 an example of an inventive spectrometer arrangement comprising a module with a converging optical unit, an entrance slit and an imaging reflection grating, as well as also a smartphone downstream of the module in light propagating direction.

FIG. 2 shows a second exemplary embodiment of the inventive spectrometer arrangement, again comprising a module 1 and a smartphone 7. Different from the first exemplary embodiment, here module 1 comprises, in addition to the transmissive converging optical unit 3 and the reflective imaging entrance slit 4, a reflective imaging grating 13. In this case, the converging optical unit 3 and the imaging grating 13 are also free-form aspheres.

The light is reflected within the main body 6 by the grating 13 onto a separate light exit area 14 and exits only through said main body from the module 1 and enters as a light beam 9 into the lens 8 of the smartphone 7.

Again, the module 1 and the smartphone 7 are mechanically connected by a holder 12 that simultaneously defines the position and orientation of the module 1 and the smartphone 7 relative to each other, and the holder 12 is preferably designed in such a manner that this connection can be manually established and severed again without any additional aids. The module 1 and the smartphone 7 can be autonomously used separate from each other.

Also in this case an intransparent light energy absorbing coating 17 is provided on the surface of the main body 6, so that no undesirable light enters through the main body surface into the interior of the module. The coating 17 leaves out only the region of the converging optical unit 3 and the area of the light exit area 14.

In a third exemplary embodiment of the inventive spectrometer arrangement as in FIG. 3 the module 1 again comprises, in addition to the converging optical unit 3 and the reflective entrance slit 4, a reflective imaging grating 13. Different from the two previous exemplary embodiments, however, the module 1 is not provided with a separate downstream imaging system but the image of the light that has been spectrally broken down by the grating is projected onto the sensor array of a two-dimensional spatially resolving detection device 15 that is directly connected to the module 1 on a light exit area 16. The signal output paths of the detection device 15 are connected to an evaluation circuit that delivers information regarding the spectrum of the light incident in the converging optical unit 3 (not pictorially illustrated).

The intransparent light energy absorbing coating 17 on the surface of the main body 6 prevents also in this case the penetration of undesired light through the main body surface into the interior of the module. The coating 17 leaves out only the area of the converging optical unit 3 and the region of the light exit area 16 or the detection device 15.

A substantial advantage of the spectrometer arrangement in accordance with the invention is the modular design and the thusly resultant flexibility in view of different applications. For example, the module in the embodiment according to FIG. 1 or FIG. 2 can be used separate, i.e., disconnected, from the downstream smartphone, as a spectral device that only breaks down the incident light according to wavelengths or frequencies.

Figure 3:
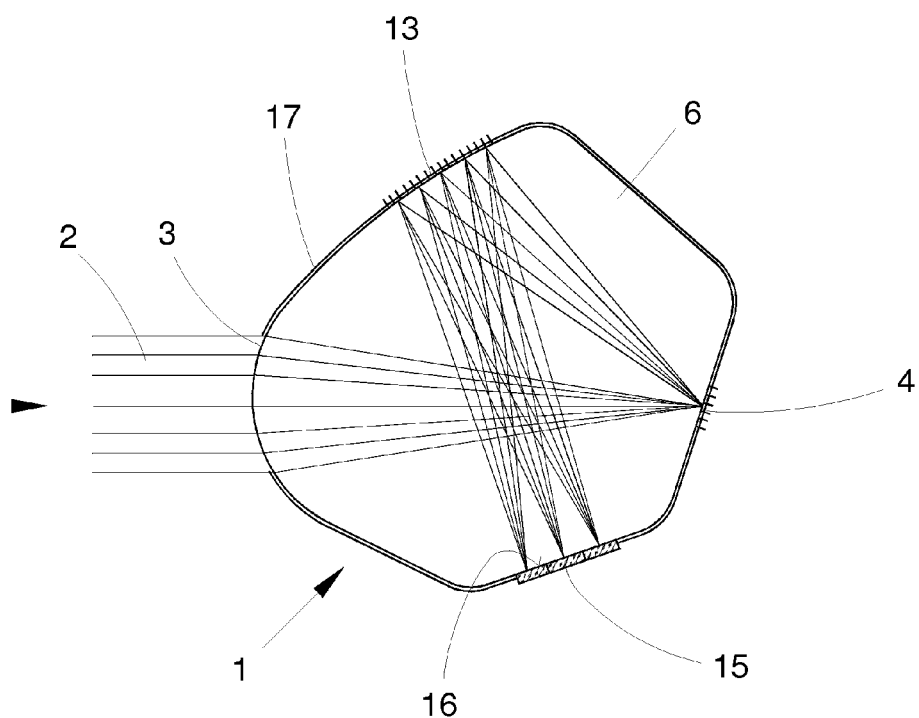
FIG. 3 an example of an inventive spectrometer arrangement comprising a module with a converging optical unit, an entrance slit and an imaging reflection grating, and a detection device arranged directly on the modular main body.

In the embodiment shown by FIG. 3 and being equipped with a detection device, the module acts as a stand-alone, compact spectrometer.

LIST OF REFERENCE SIGNS

1 Module
2 Light beam

3 Converging optical unit
4 Entrance slit
5 Imaging grating
6 Main body
7 Smartphone
8 Lens
9 Light beam
10 Detection device
11 Lens assembly
12 Holder
13 Imaging grating
14 Light exit area
15 Detection device
16 Light exit area
17 Coating

The invention claimed is:

1. Spectrometer arrangement comprising, in light propagation direction,
   a converging optical unit (3) configured for bundling and focusing light onto an entrance slit (4), and
   an imaging system downstream of the entrance slit (4), said imaging system including at least one dispersive element and being configured for imaging a dispersion spectrum of the light onto a spatially resolving detection unit, wherein
   the entrance slit is designed so as to be reflective, and
   at least the converging optical unit, the entrance slit and the dispersive element are combined in a module (1), wherein they
      are integrated as components in a monolithic main body (6) or
      are configured as optically active forms or structures on a monolithic main body (6).

2. Spectrometer arrangement as in claim 1, wherein
   the converging optical unit (3) is transmissive and molded as a curved surface region to the main body (6), and
   the light enters through the converging optical unit (3) into the module (1).

3. Spectrometer arrangement as in claim 1, wherein
   the dispersive element is configured so as to be a transmissive imaging grating (5) and is molded as a surface region exhibiting a prespecified grating structure to the main body (6), wherein
   the light exits through the imaging grating (5) out of the module (1).

4. Spectrometer arrangement as in claim 1, wherein
   the dispersive element is configured so as to be a reflective imaging grating (5) and is molded as a surface region exhibiting a prespecified grating structure to the main body (6), wherein
   the light reflected by the reflective imaging grating (13) is focused within the main body (6) onto an additional surface area (14) of the main body (6) and exits through said main body in the form of a light beam (9) out of the module (1).

5. Spectrometer arrangement as in claim 1, wherein
   the reflective entrance slit (4) is configured as mirrored area of a specific size and orientation on the surface of the main body (6), with the mirrored area extending 0.5 mm in dispersion direction and 10 mm orthogonally in dispersion direction.

6. Spectrometer arrangement as in claim 1, wherein
   the light exiting from the module (1) is focused on the spatially resolving detection device (15),
      said detection device being arranged directly on the module (1), or
      being positioned at a prespecified distance from the module (1), wherein, a parallel or collimated beam guide is provided between the module (1) and the detection device (15), and/or light-conducting fibers are provided in an optical path between the module (1) and the detection device (15).

7. Spectrometer arrangement as in claim 1, wherein
   a light beam (9) exiting from the module (1) is focused into a downstream imaging system with an integrated detection device (1), wherein optical parameters of the light beam (9) are adapted to entrance parameters of the imaging system.

8. Spectrometer arrangement as in claim 7, wherein
   the downstream imaging system is mechanically connected via a holder (12) to the module (1),
   the holder (12), at the same time, defines position and orientation of the module (1) and the imaging system relative to each other, and
   the mechanical connection between the module (1) and the downstream imaging system can be manually established and severed without any additional aids.

9. Spectrometer arrangement as in claim 8, wherein
   a commercially available opto-electronic hand-held device, in the form of a smartphone (7), is provided as the imaging system.

10. Spectrometer arrangement as in claim 1, wherein
    the converging optical unit (3) and/or an imaging grating (5, 13) are configured as aspherical lenses.

11. Spectrometer arrangement as in claim 1, wherein
    the module (1), including the module's optically active forms and structures, is made of a polymer, and
    an index of refraction of the polymer is greater than an index of refraction of the environment.

12. Spectrometer arrangement as in claim 1 further comprising anti-reflection coatings or total reflection features or color filters in the optical path.

* * * * *